Oct. 4, 1955
R. R. GOINS
2,719,873
MEANS AND METHOD FOR CONVERTING HYDROCARBONS
Filed Oct. 9, 1951
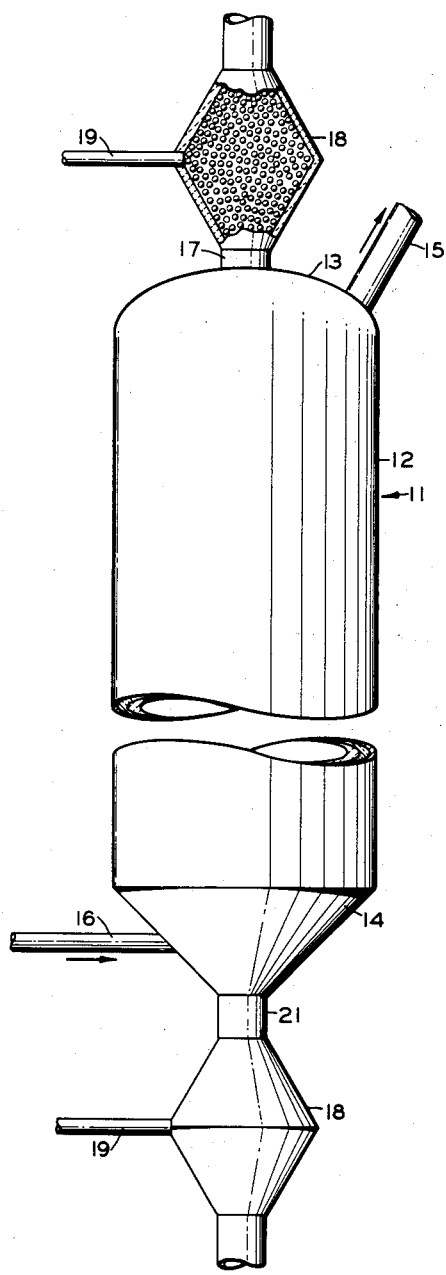
FIG. 1.
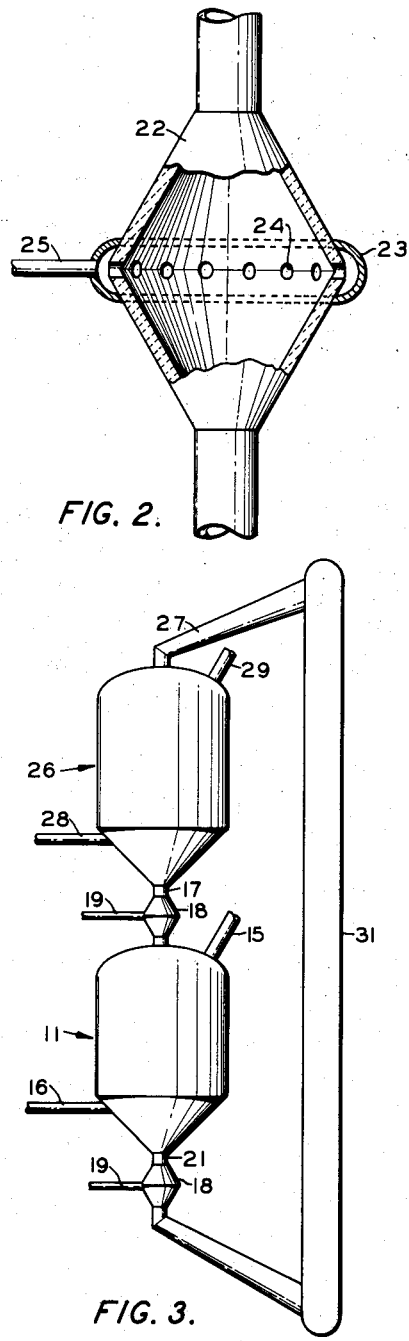
FIG. 2.
FIG. 3.
INVENTOR.
R. R. GOINS
BY *Hudson and Young*
ATTORNEYS

United States Patent Office 2,719,873
Patented Oct. 4, 1955

2,719,873

MEANS AND METHOD FOR CONVERTING HYDROCARBONS

Robert R. Goins, Bartlesville, Okla., assignor to Phillips Petroleum Company, a corporation of Delaware Application October 9, 1951, Serial No. 250,447

6 Claims. (Cl. 260—679)

This invention relates to pebble heater apparatus. In one of its more specific aspects, it relates to improved sealing means at the pebble inlet and outlet of a pebble reaction chamber. In another of its more specific aspects, it relates to improved pebble heater apparatus for the conversion of hydrocarbons. In another of its more specific aspects, it relates to the conversion of hydrocarbons in pebble heater apparatus.

Apparatus of the so-called "pebble heater" type has been utilized in recent years for the purpose of heating fluids to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater-type apparatus includes two refractory-lined contacting chambers disposed one above the other and connected by a refratcory-lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form having strength which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about 1 inch in diameter. In a high temperature process, pebbles having a diameter of between about ¼ to ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chamber. Generally pebble inlet temperatures in the second chamber are about 100° F. to 200° F. below the highest temperature of the pebbles within the first chamber. In processes for the production of ethylene from light hydrocarbons such as ethane or propane the pebble temperature is usually in the range of 1200° F. to 1800° F. For the production of acetylene by pyrolysis of hydrocarbons temperatures in the range of 1800° F. to 3000° F. are desirable. It is usually desirable, and in many cases essential, to prevent gases from passing from one of the contacting chambers to the other via the pebble throat. Thus, the presence of combustion products such as the oxides of carbon in superheated steam, or in reaction products such as acetylene or ethylene, may lead to numerous process difficulties at points in the system downstream from the pebble heater itself. The alternative of permitting even a slight flow of products from the process chamber into the pebble heating chamber is often unattractive economically. While it is theoretically possible, by a careful control of the relative pressures in the two chambers, to maintain a pressure differential so low that no flow can occur, it has been found as a practical matter that such close balancing of pressures often is not feasible. Hence, it has become the practice to introduce a small stream of an inert sealing or blanketing gas, usually steam, into the throat. Such gas is usually permitted to flow in both directions, i. e., into both the heating chamber and the reactor, thereby preventing flow from either chamber into the other.

While this practice has been of value in preventing flow of gases between chambers it has been found that the introduction of steam into a cylindrical column of pebbles at temperatures at which it is ordinarily most available, i. e., 300° F. to 1000° F. may result in exposing the pebbles to thermal shock of such magnitude that the useful life of the pebbles is materially shortened. Thus, the art is confronted with the problem of supplying a throat-sealing gas at a temperature sufficiently high to avoid thermally shocking the pebbles without resorting to the use of ordinary products of combustion, which, while they can be supplied at high temperatures are objectionable on other grounds. The alternative of employing hot combustion gases for sealing purposes, in order to avoid the effects of thermal shock on pebbles, is often unattractive because of the resulting dilution of products with difficultly separable gases.

By at least one aspect of this invention, at least one of the following objects of invention is attained. An object of this invention is to provide improved pebble heater apparatus for converting hydrocarbons. Another object of the invention is to provide improved means for introducing sealing gas into pebble throats of pebble heater apparatus. Another object of the invention is to provide an improved method for sealing the reaction chamber of pebble heater apparatus from the pebble heater chamber of such apparatus. Another object of the invention is to provide a method for preventing flow of gases from one pebble chamber to the other of pebble heater apparatus while preventing any substantial pebble breakage by reason of thermal shock. Other and further objects and advantages will be apparent to those skilled in the art upon study of the accompanying discussion and the drawings.

Broadly speaking, this invention comprises introducing an inert sealing gas such as steam into pebble throats in a manner such that thermal shock of the pebbles is materially reduced. The pebble throat is provided with an enlarged portion therein, the inner surface of such enlarged portion preferably being of such form as to permit the flow of pebbles therethrough at varied flow rates. The enlargement of the cross section in one portion of the pebble throat causes the pebbles flowing along the periphery of that section to gravitate at a considerably lower rate than those pebbles gravitating through the axial portion of the pebble throat. The pebbles flowing at a lower rate give up much more of their heat to the inert or steam sealing gas and thus the outer layer of pebbles within the enlarged portion of the pebble throat is considerably cooler than the more rapidly gravitating pebbles in the axial portion of the pebble throat. Thus the peripheral pebble portion is at such a temperature that thermal shock thereof is substantially obviated, and the sealing gas is substantially preheated so as to materially lessen the possibility for thermal shock of the hotter pebbles by reason of their contact with the sealing gas.

Better understanding of this invention will be obtained upon reference to the diagrammatic drawings in which Figure 1 is a sectional elevation of a pebble chamber with sealing means in the pebble inlet and outlet. Figure 2 is a sectional elevation of a preferred modification of the improved sealing chamber of a pebble throat. Figure 3 is a schematic elevation of pebble heater apparatus.

Referring particularly to Figure 1 of the drawings pebble chamber 11 comprises upright elongated shell 12 closed at its upper and lower ends by closure members 13 and 14, respectively. Gaseous effluent outlet conduit 15 is provided in the upper end portion of chamber 11, preferably in closure member 13 and gaseous material inlet conduit 16 is provided in the lower portion of chamber 11, preferably in or adjacent to closure member 14. Pebble inlet conduit 17 is provided in the upper end of chamber 11 and is preferably axially disposed in closure member 13. Pebble inlet conduit 17 is provided intermediate its ends with a chamber 18 of enlarged cross section, which chamber 18 is provided with a sealing gas inlet conduit 19. Conduit sealing chamber 18 is preferably formed as oppositely extending frusto-conical members connected at their bases or enlarged ends and connected at their smaller ends to throat sections of uniform diameter. It is preferred that the inner surface of the upper portion of the expanded chamber 18 have a slope which is at least as great as the normal angle of repose of pebbles. The normal angle of repose of pebbles ordinarily varies from the horizontal by an angle within the range of 28° to 32°. The slope of the inner surface of the lower portion of the expanded chamber 18 should not, in a preferred form, deviate from the horizontal by less than the normal angle of repose or by more than about 35° for the reason that the purpose of this expanded conduit section is to materially retard or halt the flow of pebbles through the peripheral portion of that chamber. Ordinarily it is desirable to obtain a very low gravitational flow rate of pebbles through that peripheral conduit section so that a sufficiently great temperature gradient is obtained across the pebble mass within that conduit chamber to materially preheat the sealing gas.

Pebble outlet conduit 21 is provided in the lower end portion of chamber 11 and conduit 21 is similarly provided with an enlarged cross sectional chamber as described in connection with pebble conduit 17. The enlarged sealing chamber and the sealing gas inlet in conduit 21 are designated by numerals 18 and 19 inasmuch as they are ordinarily identical with the ones in conduit 17.

Although the enlarged sealing chamber in the pebble conduits preferably have lower surfaces which slope from the horizontal by at least the angle of repose of pebbles, in one modification of this invention the contour of the inner surface of this section can be such that a peripheral section of pebbles will be maintained substantially static therein. This portion of pebbles is heated by radiation from the normally gravitating mass of heated pebbles and a temperature gradient is established across this static mass of pebbles. By the means above described it will be noted that thermal shock of hot gravitating pebbles will be materially reduced.

Referring particularly to the device shown as Figure 2 of the drawings sealing chamber 22 is quite similar to sealing chamber 18 described above and the section shown in Figure 2 differs therefrom in that a gas distribution chamber or bustle ring 23 is provided about the periphery of sealing chamber 22 and gaseous material inlets 24 provide gaseous communication between the interior of gas distribution chamber 23 and the interior of sealing chamber 22. Sealing gas inlet conduit 25 extends between a sealing gas supply source, not shown, and the interior of gas distribution chamber 23.

In the operation of pebble heater apparatus such as is schematically shown in Figure 3 of the drawings, pebbles are introduced into the upper portion of heating chamber 26 through inlet conduit 27 and form a contiguous gravitating mass of pebbles therein. Gaseous heating material is introduced into the lower portion of chamber 26 through inlet conduit 28 and flows upwardly through the gravitating mass of pebbles in chamber 26, raising the temperature of those pebbles to one which is at least 100° F. to 200° F. above the desired reaction temperature within reaction chamber 11. Gaseous effluent is removed from the upper portion of chamber 26 through effluent outlet conduit 29. The hot pebbles are gravitated from the lower portion of chamber 26 through restricted pebble throat 17 and gravitate downwardly through enlarged sealing chamber 18 into the upper portion of chamber 11.

Inert sealing gas is introduced into the mass of hot gravitating pebbles in the sealing chamber 18. As pointed out above, the sealing gas is preheated in the peripheral pebble portion which may be slowly moving or may be static, depending upon the slope of the bottom portion of the sealing chamber. The pebbles form a contiguous gravitating bed within chamber 11. Gaseous reactant materials are introduced into the lower portion of chamber 11 through inlet conduit 16 and flow upwardly through the gravitating mass of pebbles within that chamber being raised to reaction temperature in the direct heat exchange therewith. Resulting reaction products are removed from the portion of chamber 11 through gaseous effluent conduit 15 in the upper portion of that chamber. Pebbles are gravitated from the bottom of chamber 11 through pebble outlet conduit 21 and sealing chamber 18 and are returned to the upper portion of chamber 26 by means of elevator 31 which may be a mechanical type of elevator such as a bucket type or a helical-conveyor type, or by means of a gas-lift type elevator. When a gas-lift type elevator is utilized the sealing chamber 18 may not be required in the conduit down stream of chamber 11, the lift gas sufficiently sealing that conduit to prevent unreasonable flow of materials from chamber 11 into chamber 26.

Gaseous sealing material is introduced into sealing chamber 18 as described above whereby the peripheral portions of the pebbles within the enlarged sealing chambers are maintained at a substantially lower temperature by reason of their lower flow rate or stagnation than are the pebbles gravitating through the central portion of the pebble throat. This operation materially reduces the amount of thermal shock of pebbles in both the axial and peripheral sections of the pebble throat and thus concomitantly reduces pebble breakage within the pebble heater apparatus.

Although this invention has been particularly described in connection with the introduction of steam into the sealing section of the pebble throats, other gaseous materials which are inert to the reaction being carried on within the reaction chamber may be utilized. Materials such as hydrogen, methane or ethane, may in many instances be suitable sealing gases. The device of this invention is particularly applicable for use in connection with any sealing gas which is normally available at a temperature which would result in considerable pebble breakage if such gas were introduced directly into the gravitating mass of pebbles at the higher temperature to which they have been raised by the heat exchange within pebble heat exchange chamber 26. A sealing gas temperature within 500° F. and preferably within 200° F. of the particular pebbles with which the gas is contacted, is usually satisfactory. Operation with these temperature differentials can ordinarily be obtained by means of this invention.

Various modifications of this invention will be apparent to those skilled in the art upon study of the accompanying disclosure and the drawings. Such modifications can be made without departing from the spirit and the scope of this invention.

I claim:

1. An improved pebble heat exchange chamber assembly comprising in combination an upright, closed, elongated shell having a fluid inlet and a fluid outlet therein; pebble inlet means in the upper end of said chamber, said pebble inlet means having an interior section of expanded cross section, the slope of the inner surface in the lower portion of said expanded cross section extending downwardly and inwardly from the horizontal by an angle within the range of between 28° and 35°; gaseous material inlet means in the portion of largest cross section; and pebble outlet means in the lower end of said chamber.

2. The pebble heat exchange assembly of claim 1, wherein said pebble outlet means has an interior section of expanded cross section, the slope of the inner surface of the upper portion of said expanded cross section extending downwardly and outwardly from the horizontal by an angle of at least 28°.

3. The pebble heat exchange assembly of claim 1, wherein said pebble outlet means has an interior section of expanded cross section, the slope of the inner surface in the lower portion of said expanded cross section extends downwardly and inwardly from the horizontal by an angle within the range of between 28° and 35°; and gaseous material inlet means in the portion of largest cross section of said expanded section of said pebble outlet means.

4. An improved pebble heater assembly comprising in combination a first upright, closed, elongated shell; fluid inlet means in the lower portion of said first shell; gaseous effluent outlet conduit means in the upper portion of said first shell; pebble inlet means in the upper portion of said shell; a second upright, closed, elongated shell positioned below said first shell; pebble conduit means extending between the lower end portion of said first shell and the upper end portion of said second shell, said pebble conduit means having an interior section of expanded cross section, the slope of the inner surface in the lower portion of said expanded cross section extending downwardly and inwardly from the horizontal by an angle within the range of between 28° and 35°; gaseous material inlet means connected to said pebble conduit at the point of greatest expanded interior cross section; gaseous material inlet conduit means in the lower end portion of said second shell; gaseous effluent conduit means in the upper end portion of said second shell; pebble outlet means in the lower end of said second shell; and elevator means operatively connected to the lower end of said pebble outlet means from said second shell and to the inlet end of said pebble inlet means in the upper portion of said first shell.

5. The pebble heater assembly of claim 4, wherein said pebble outlet means from said second shell has an interior section of expanded cross section, the slope of the inner surface in the lower portion of said expanded cross section extending downwardly and inwardly from the horizontal by an angle within the range of between 28° and 35°; and gaseous material inlet means connected to said pebble outlet means at the point of greatest interior cross section.

6. The method of operating a pebble heater in the conversion of hydrocarbons while preventing thermal shock of pebbles therein which comprises gravitating a mass of pebbles downwardly through a pebble heating zone; heating said pebbles to a temperature within the range of between 1400° F. and 3200° F.; passing said heated pebbles through a seal zone of expanded cross section so that the central core of pebbles flows more rapidly through said seal zone than do pebbles which are progressively laterally spaced in said seal zone from said central core of pebbles; introducing steam into said seal zone at the point of its greatest cross section in sufficient volume to maintain interstices between said pebbles steam full; gravitating said heated pebbles into a reaction zone at a temperature in the range of 1200° F. to 3100° F.; gravitating said heated pebbles through said reaction zone as a pebble mass; introducing a hydrocarbon reactant material into the lower portion of said reaction zone; passing said hydrocarbon reactant material upwardly through said gravitating mass of heated pebbles so as to raise said hydrocarbon to reaction temperature in direct heat exchange with said heated pebbles; removing resulting reaction products from the upper portion of said reaction zone; gravitating pebbles from the lower portion of said reaction zone; and elevating said pebbles to the upper portion of said pebble heating zone.

References Cited in the file of this patent

UNITED STATES PATENTS

| | | |
|---|---|---|
| 2,403,608 | Payne et al. | July 9, 1946 |
| 2,423,411 | Simpson | July 1, 1947 |
| 2,439,730 | Happel | Apr. 13, 1948 |
| 2,441,311 | Crowley et al. | May 11, 1948 |
| 2,556,514 | Bergstrom | June 12, 1951 |
| 2,571,342 | Crowley | Oct. 16, 1951 |